(12) United States Patent
Teranishi et al.

(10) Patent No.: US 7,535,406 B2
(45) Date of Patent: May 19, 2009

(54) VEHICULAR LAMP INCORPORATING MILLIMETER RADAR

(75) Inventors: Yasuo Teranishi, Shizuoka (JP);
Nobutaka Tezuka, Shizuoka (JP);
Toshinao Daicho, Shizuoka (JP);
Takashi Hori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/002,217

(22) Filed: Dec. 14, 2007

(65) Prior Publication Data

US 2008/0158045 A1 Jul. 3, 2008

(30) Foreign Application Priority Data

Dec. 27, 2006 (JP) .............................. 2006-353469

(51) Int. Cl.
*G01S 13/00* (2006.01)
*G01S 7/02* (2006.01)
(52) U.S. Cl. ........................................................ 342/70
(58) Field of Classification Search ................. 342/165, 342/70, 61; 362/487, 507; 343/721, 711–714
See application file for complete search history.

(56) References Cited

U.S. PATENT DOCUMENTS

| | | | |
|---|---|---|---|
| 5,313,213 A * | 5/1994 | Neumann et al. | 342/165 |
| 5,446,470 A * | 8/1995 | Avignon et al. | 343/721 |
| 6,459,476 B2 | 10/2002 | Nishimura | |
| 6,714,156 B1 * | 3/2004 | Ibrahim et al. | 342/165 |
| 2002/0175868 A1 * | 11/2002 | Reichert | 343/711 |
| 2005/0068251 A1 * | 3/2005 | Ebling et al. | 343/911 L |
| 2007/0008234 A1 * | 1/2007 | Capps et al. | 343/721 |

* cited by examiner

*Primary Examiner*—Dan Pihulic
(74) *Attorney, Agent, or Firm*—William L. Androlia; H. Henry Koda (57) ABSTRACT

A vehicular lamp 1 including a lamp unit 13 provided inside a lamp chamber 7 so that the optical axis direction of lamp unit 13 is adjustable with the use of a tilting movement adjustment mechanism 15. The lamp chamber 7 is formed by a lamp body 3 and a transparent front cover 5 attached to the front opening of the lamp body 3, while the lamp unit 13 is formed by a reflector 9 and a light source 11. A millimeter wave radar device 25 is installed in the vehicular lamp, and it is composed of a controlling unit 25B and an antenna unit 25A that are provided separately from each other so that the controlling unit is attached to the lamp body and the antenna unit is attached to the lamp unit.

5 Claims, 6 Drawing Sheets

VEHICULAR LAMP INCORPORATING MILLIMETER RADAR

BACKGROUND OF THE INVENTION

1. Field of the Invention

The present invention relates to a vehicular lamp that includes a lamp unit comprised of a reflector and a light source and provided in a lamp chamber, which is formed by a lamp body having a front opening and a transparent front cover attached to the front opening of the lamp body, so that the optical axis direction of the lamp unit is adjusted by a tilting movement adjustment mechanism.

2. Description of the Related Art

Laser radar mechanisms have conventionally been in practical use as apparatuses that detect a separation distance and a relative velocity between a vehicle and an object present so as to oppose the traveling direction of the vehicle or the periphery of the vehicle.

Such laser radar mechanisms detect the separation distance and the relative velocity with respect to an object by emitting a laser beam toward the object and then receiving a reflection beam from the object.

Conventionally, such laser radar mechanisms are fixed to the front of a vehicle body in order to, for example, detect vehicular front information such as an inter-vehicular distance between the vehicle and another vehicle traveling in front of the vehicle.

However, when the laser beam emitting portion or the laser beam receiving portion of such a laser radar mechanism that is fixed to the front of the vehicle body while being exposed to the surroundings becomes dirty due to mud splashes while the vehicle is in operation or the like, the detection ability of the laser radar mechanism would be lowered. When this occurs, then it becomes impossible to achieve a predetermined level of detection performance. To cope with this situation, it has been suggested that, for example, a laser radar mechanism be covered by an exclusive-use cover that surrounds the laser radar mechanism. However, this leads to a problem that the installation of the exclusive-use cover makes the cost of the vehicle higher.

In addition, when such a laser radar mechanism is fixed to the front of a vehicle body, another problem arises. The detection angle of the laser radar mechanism is affected by changes in the posture of the vehicle.

In order to solve these problems, a proposal has been made in which a front information detecting means such as a laser radar mechanism is fixed to a lamp unit that is installed in a vehicular lamp as disclosed in U.S. Pat. No. 6,459,476. In this vehicular lamp, the lamp unit is provided inside a lamp chamber so that the optical axis direction of the lamp unit is adjusted by a tilting movement adjustment mechanism (i.e., optical axis direction adjusting means), wherein the lamp chamber is comprised of a lamp body that has a front opening in the front thereof and a transparent front cover attached to the front opening of the lamp body, and the lamp unit is comprised of a reflector and a light source.

In this structure, since the laser radar mechanism is housed in the lamp chamber that is installed in the vehicular lamp, the laser radar mechanism is protected from, for instance, mud splashes during the operation of the vehicle, and an exclusive-use cover is not required to be installed.

In addition, since the laser radar mechanism is able to make a tilting movement together or integrally with the lamp unit by the tilting movement adjustment mechanism, and since the radiation angle of the radiated laser beam can be appropriately adjusted, the reflection beam that corresponds to the front information is not affected by the changes in the posture of the vehicle, and it is possible to accurately detect the vehicular front information.

However, when the laser radar mechanism is attached to the lamp unit itself that is driven by the tilting movement adjustment mechanism as described above, the load applied on the tilting movement adjustment mechanism is extremely large since the laser radar mechanism is generally quite heavy. As a result, it is necessary to increase the strength of the mechanism elements of the tilting movement adjustment mechanism; and in addition, a smooth performance of the tilting movement adjusting operation by the tilting movement adjustment mechanism is prevented.

BRIEF SUMMARY OF THE INVENTION

In view of the above, it is an object of the present invention to solve the problems described above and to provide a vehicular lamp that properly detects a separation distance (or an inter-vehicle distance) and/or a relative velocity with respect to an object, without having to increase the mechanical strength of a tilting movement adjustment mechanism that makes the tilting movement of the lamp unit.

The above objects is accomplished by a unique structure of the present invention for a vehicular lamp that includes a lamp chamber, which is comprised of a lamp body having a front opening and a transparent front cover attached to the front opening, and a lamp unit, which is provided inside the lamp chamber so that the optical axis direction of the lamp unit is adjustable with the use of a tilting movement adjustment mechanism; and in the present invention,

- a millimeter wave radar device that emits a millimeter wave signal and detects a separation distance and/or a relative velocity with respect to an object, based on a reflection wave signal from the object that has reflected the emitted millimeter wave signal is provided within the lamp chamber;
- the millimeter wave radar device is comprised of an antenna unit and a controlling unit that are provided separately from each other, wherein the antenna unit transmits the millimeter wave signal and receives the reflection wave signal resulting from the emitted millimeter wave signal, and the controlling unit controls the operations to transmit and receive the millimeter wave signal performed by the antenna unit so as to detect, based on the reflection wave signal received by the antenna unit, the separation distance and/or the relative velocity with respect to the object that has reflected the millimeter wave signal; and
- the controlling unit of the millimeter wave radar device is attached to the lamp body, and the antenna unit is attached to the lamp unit.

In the vehicular lamp of the present invention as described above, the millimeter wave radar device that detects the separation distance and/or the relative velocity of an object (a preceding vehicle, for instance) is housed in the lamp chamber that is installed in the vehicular lamp. Accordingly, it is possible to protect the millimeter wave radar device from mud splashes, rain water, and the like that affect the vehicle when the vehicle is in operation, without installing an exclusive-use cover for the millimeter wave radar device.

Further, the radiation direction of the millimeter wave signal emitted by the millimeter wave radar device is set by the antenna unit that is attached to the lamp unit. Accordingly, it is possible to adjust the direction of the millimeter wave signal integrally with the lamp unit by the tilting movement adjustment mechanism; and as a result, the millimeter wave signal is accurately radiated onto the object that is present in the radiation direction of the illumination light emitted by the lamp unit, and the separation distance and/or the relative velocity with respect to the object can be detected accurately based on the reflection wave signal resulting from the millimeter wave signal.

Furthermore, in the present invention, the millimeter wave radar device which is generally heavy is not attached to the lamp unit that is a load on the tilting movement adjustment mechanism, and it is instead attached to the lamp body. In other words, the only component that is added to the lamp unit and becomes a load on the tilting movement adjustment mechanism is the antenna unit that is lightweight and emits, toward the front of the lamp, the millimeter wave signal. Accordingly, it is possible to keep the increase in the load on the tilting movement adjustment mechanism to an extremely small level. As a result, the radar device that detects the separation distance and/or the relative velocity with respect to an object can be installed without increasing the strength of the tilting movement adjustment mechanism that makes tilting movements of the lamp unit. In addition, the installation of the millimeter wave radar device does not prevent the tilting movement adjustment mechanism from smoothly performing the tilting movement adjusting operation of the lump unit.

In the present invention, it is desirable that the antenna unit is provided in an area that is visible from the front cover side.

With this arrangement, it is possible to enhance the designability of the vehicular lamp by, for example, utilizing the antenna unit as a part of the design of the lamp to improve its appearance.

In addition, by changing the positions of the antenna unit, it is possible to easily give diversity to the exterior design of the lamp.

Furthermore, in the present invention, it is desirable that the antenna unit is provided is a reflective surface of a reflector of the lamp unit.

In the vehicular lamp described above, since the antenna unit can be installed at different locations, it is possible to allow the design of the reflector to have a sophisticated design-oriented characteristic, and thus, the designability of the reflector is high. In addition, because the surface of the reflector is a curved plane and the radiated light from the light source is reflected thereby toward a target position, the surface of the reflector is used as the radiation position from which the millimeter wave signal is radiated, and it is possible to achieve a high level of radiation performance.

Furthermore, in the present invention, it is desirable that the lamp unit is a projector type lamp unit in which a reflection beam from the reflector is radiated toward front of the vehicular lamp through a projection lens that is provided in front of the reflector, and the area the antenna unit is provided is either the front surface or the rear surface of the projection lens.

In this vehicular lamp, it is possible to easily give diversity to the exterior design of the projection lens by merely changing the positions of the antenna unit.

Also, in the present invention, the area the antenna unit is provided can be a surface of a member such as a bezel or a reflector fixing bracket that is provided on the outside periphery of a reflector of the lamp unit.

In this vehicular lamp of the present invention, it is possible to enhance the designability of the lamp by allowing the outside periphery of the reflector to have a design-oriented characteristic. In addition, since the antenna unit does not block the reflection beam from the reflector or the direct light from the light source, the installation of the antenna unit does not lower the light quantity utilization efficiency of the radiation in the forward direction.

As seen from the above, according to the vehicular lamp of the present invention, the millimeter wave radar device is, without installing an exclusive-use cover, protected from mud splashes, rain water, and the like that would affect the vehicle performance when the vehicle is in operation. Consequently, with elimination of the cover that is exclusively used for protecting the radar, it is possible to lower the cost related to the installation of the radar. In addition, since the radiation direction of the millimeter wave signal emitted by the millimeter wave radar device is set by the antenna unit attached to the lamp unit, it is possible to adjust the direction of the emitted millimeter wave signal integrally with the lamp unit by the tilting movement adjustment mechanism. As a result, it is possible to accurately radiate the millimeter wave signal onto the object that is present in the radiation direction of the illumination light emitted by the lamp unit and also to detect the separation distance and/or the relative velocity with respect to the object based on the reflection wave signal resulting from the millimeter wave signal.

Further, in the present invention, the controlling unit itself which is of the millimeter wave radar device and is generally heavy is attached to the lamp body. In other words, in the present invention, the only component that is added to the lamp unit and becomes a load on the tilting movement adjustment mechanism is the reflection mirror that reflects, toward the front of the lamp, the millimeter wave signal emitted by the millimeter wave radar device. Accordingly, it is possible to keep the increase in the load on the tilting movement adjustment mechanism to an extremely small level; and as a result, the millimeter wave radar, which detects the separation distance and/or the relative velocity with respect to an object, can be installed without increasing the strength of the tilting movement adjustment mechanism that causes the tilting motion of the lamp unit. Also, the installation of the radar does not prevent smooth performance of the tilting movement adjustment mechanism.

Consequently, the vehicular lamp of the present invention not only has the conventional function to radiate illumination light but also is able to properly detect the separation distance and/or the relative velocity of an object present in the illumination light radiation direction.

DETAILED DESCRIPTION OF THE INVENTION

Hereafter, a vehicular lamp according the present invention will be described in detail with reference to the accompanying drawings.

Figure 1:
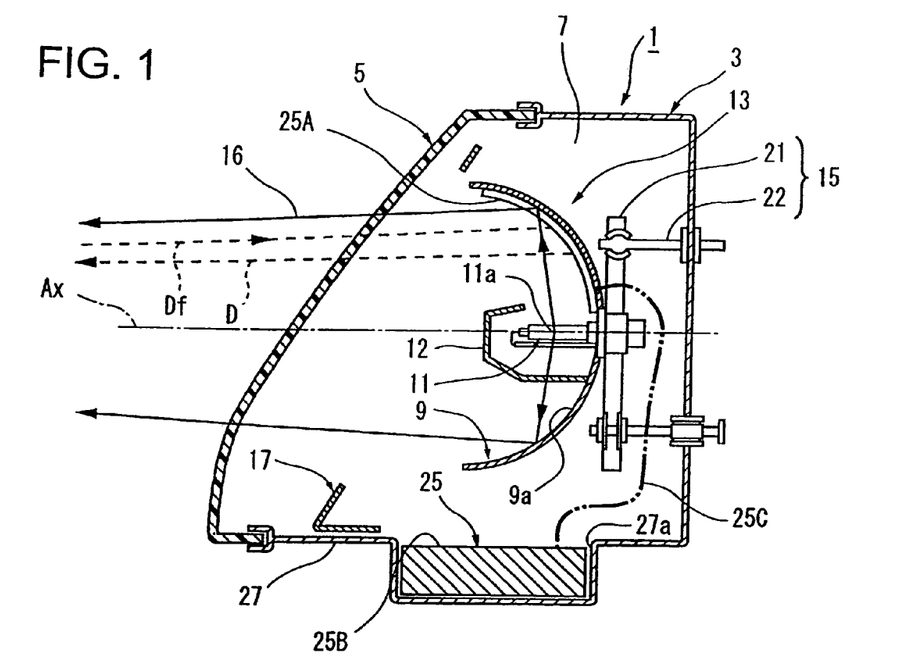
FIG. 1 is a longitudinal sectional view of a vehicular lamp according to a first embodiment of the present invention.
Figure 2:
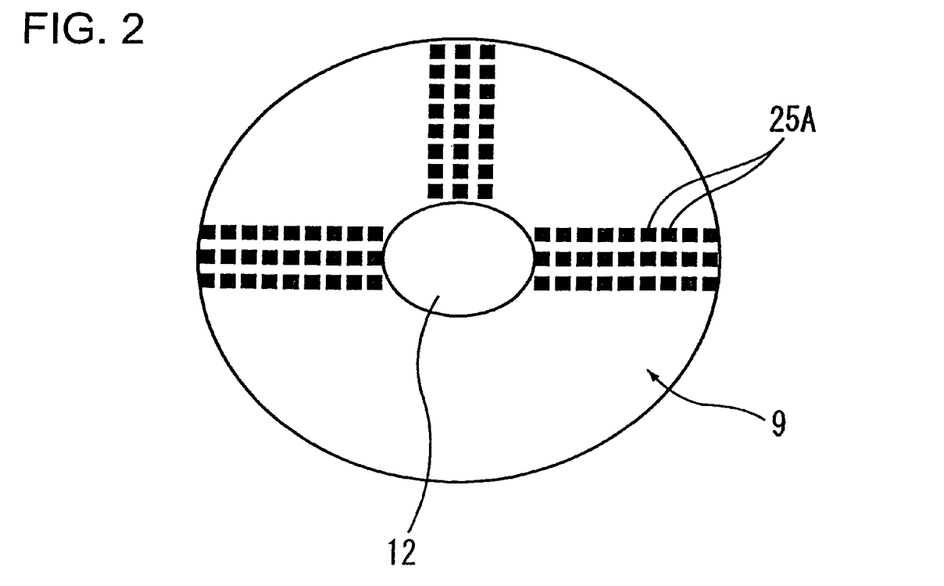
FIG. 2 is a front view of the reflector of the vehicular lamp shown in FIG. 1.

FIG. 1 is a longitudinal sectional view of a vehicular lamp according to a first embodiment of the present invention, and FIG. 2 is a front view of the reflector of the vehicular lamp shown in FIG. 1.

The vehicular lamp 1 shown in FIG. 1 is used as a headlamp of a vehicle. The lamp 1 includes a lamp unit 13 that is provided within a lamp chamber 7 in such a manner that the direction of an optical axis Ax of the lamp unit 13 is adjustable with the use of a tilting movement adjustment mechanism 15. In this structure, the lamp chamber 7 is defined and formed by a lamp body 3 that has a front opening in the front thereof and is configured to be fixed to a vehicle body and a transparent front cover 5 that is attached to the front opening of the lamp body 3, and the lamp unit 13 is comprised of a reflector 9 and a light source 11.

The reflector 9 has a reflective surface 9a of a generally parabolic curved plane shape, with the focal point being at a light emitting unit 11a of the light source 11 which is a discharge bulb. The central axis of the reflective surface 9a having a shape of generally parabolic curved plane is the optical axis Ax positioned at the center of a radiated light flux 16 reflected on the reflective surface 9a toward the front of the vehicle.

A shade 12 of which the front end is hemispherically-shaped is provided in front of the light source 11. The shade 12 blocks part of the reflection beam from the reflector 9 and also blocks the light emitted forward directly from the light source 11, thus adjusting a radiation pattern.

The reflector 9 is provided with an extension 17 on its outside periphery of the front end so that the open space behind the reflector 9 is prevented from being seen from the front cover 5 side through a gap that is between the reflector 9 and the lamp body 3. This reflector extension 17 is fixed to the lamp body 3 by a frame member, which is not shown in the drawings.

The tilting movement adjustment mechanism 15 is comprised of a frame 21 onto which the lamp unit 13 is fixed and a tilt adjusting means 22 that is joined to the lamp body 3 in such a manner that the tilt adjusting means 22 can adjust the posture of the supporting frame 21 by an arbitrary angle in a horizontal direction and in a vertical direction.

More specifically, the tilt adjusting means 22 is comprised of, for example, an aiming mechanism that adjusts the angle of the optical axis Ax so as to be inclined slightly downward with respect to the horizontal direction and a swivel mechanism that automatically adjusts the optical axis Ax in the horizontal direction in accordance with a steering angle made by the operation of the steering wheel. When an aiming adjustment has been made by the aiming mechanism, the optical axis Ax is normally inclined in a direction that is approximately 0.5 to 0.6 degrees downward with respect to the horizontal direction.

In the vehicular lamp described above, a millimeter wave radar device 25 is provided inside the lamp unit 13, and this millimeter wave radar device 25 is set to emit a millimeter wave signal D using a 76 GHz band and detect vehicular front information such as a separation distance and/or a relative velocity with respect to an object (for instance, a preceding vehicle), based on a reflection wave signal Df from the object that has reflected the millimeter wave signal D.

The millimeter wave radar device 25 is comprised of an antenna unit 25A and a controlling unit 25B that are provided separately from each other. The antenna unit 25A emits the millimeter wave signal D and receives the reflection wave signal Df resulting from the emitted millimeter wave signal D. The controlling unit 25B controls the operations of transmitting and receiving functions of the millimeter wave signal D performed by the antenna unit 25A so as to detect the separation distance and/or the relative velocity with respect to the object that has reflected the millimeter wave signal D, based on the reflection wave signal Df received by the antenna unit 25A. The antenna unit 25A and the controlling unit 25B are electrically connected to each other by a signal cable 25C.

The controlling unit 25B of the millimeter wave radar device 25 is comprised of a high frequency circuit unit and a signal processing unit. The high frequency circuit unit generates the millimeter wave signal D, and the signal processing unit performs a transmission/reception control of the generated millimeter wave signal D and a calculation process to calculate the separation distance and/or the relative velocity with respect to the object based on a time period that has elapsed before the reflection wave signal Df is received. As a result, the controlling unit 25B is quite heavy.

In the shown embodiment, the controlling unit 25B, which is heavy, is attached to the lamp body 3; and the antenna unit 25A, which is lightweight, is attached to the lamp unit 13.

In the shown embodiment, the position in which the antenna unit 25A is provided is the reflective surface 9a of the reflector 9, which is an area visible from the front cover 5.

The antenna unit 25A on the reflective surface 9a of the reflector 9 is designed so as to be in a certain form while a visual design effect is taken into consideration; and in the shown embodiment, as seen from FIG. 2, the antenna unit 25A is arranged so as to be in the form of a plurality of lines that extends in a radial direction of the reflector 9.

The controlling unit 25B is provided beneath the lamp unit 13. More specifically, the controlling unit 25B, which includes the high frequency circuit unit and the signal processing unit built therein, is attached to a recessed portion 27a that is formed on the bottom wall 27 of the lamp body 3 positioned beneath the lamp unit 13.

In the vehicular lamp 1 described above, the millimeter wave radar device 25 that detects the separation distance and/or the relative velocity of an object is housed in the lamp chamber 7 installed in the vehicular lamp 1. As a result, the millimeter wave radar device 25 is protected from mud splashes, rain and the like that would affect the vehicle performance when the vehicle is in operation, without installing an exclusive-use cover. Consequently, since the cover that is exclusively used for protecting the radar is eliminated, the cost related to the installation of the millimeter wave radar device 25 can be lowered.

In addition, in the vehicular lamp 1 described above, the radiation direction of the millimeter wave signal D emitted by the millimeter wave radar device 25 is set by the antenna unit 25A attached to the lamp unit 13. Accordingly, the direction of the millimeter wave signal D is adjusted with the lamp unit 13 by the tilting movement adjustment mechanism 15. As a result, it is possible to accurately radiate the millimeter wave signal D onto the object that is present in the radiation direction of the illumination light emitted by the lamp unit 13 and also to detect the separation distance and/or the relative velocity of the object based on the reflection wave signal Df resulting from the millimeter wave signal D. Moreover, the millimeter wave radar device 25 is less likely to be affected by bad weather such as rain, snow, or frost than conventional laser radar mechanisms that use a laser beam, and as a result, the level of precision in the detection process is higher as well.

Further, in the vehicular lamp 1 described above, the controlling unit 25B that is a part of the millimeter wave radar device 25 and is heavy is attached to the lamp body 3. In other words, the controlling unit 25B is not attached to the lamp unit 13, which means that the controlling unit 25B is not a load on the tilting movement adjustment mechanism 15. Since the component part that is added to the lamp unit 13 and becomes a load on the tilting movement adjustment mechanism 15 is the antenna unit 25A that is lightweight and emits the millimeter wave signal D toward the front of the lamp, the increase in the load on the tilting movement adjustment mechanism 15 is kept at extremely small level. As a result, the millimeter wave radar device 25 that detects the separation distance and/or the relative velocity of an object can be installed without increasing the strength of the tilting movement adjustment mechanism 15 that makes the tilting movements of the lamp unit 13. Also, the installation of the millimeter wave radar device 25 does not prevent the tilting movement adjustment mechanism 15 from smoothly performing its tilting movement adjusting operation.

Consequently, the vehicular lamp 1 described above not only has the conventional function to radiate illumination light but also is able to properly detect the separation distance and/or the relative velocity of an object that is present in the radiation direction of the millimeter wave signal.

Furthermore, in the vehicular lamp 1 descried above, the controlling unit 25B of the millimeter wave radar device 25 is positioned beneath the lamp unit 13.

In this arrangement, the air which is heated and the temperature has become higher due to the heat generated by the light source 11 of the lamp unit 13 flows toward the upper portion of the lamp chamber 7; and thus, the controlling unit 25B of the millimeter wave radar device 25 provided on a lower side of the lamp is less affected by the heat. Consequently, the heat resistance level of the millimeter wave radar device can be low, and the millimeter wave radar device has a lower level of heat resistance.

Also, in the vehicular lamp 1 of the shown embodiment, the antenna unit 25A is provided in the area that is visible from the front cover 5 side. Thus, it is possible to enhance the designability of the vehicular lamp 1 by, for example, utilizing the antenna unit 25A as a part of the design of the lamp to improve the appearance. In addition, by merely changing the positions of the antenna unit 25A, it is possible to change the exterior design of the lamp.

Furthermore, in the above-described vehicular lamp 1, the area in which the antenna unit 25A is provided is the reflective surface 9a of the reflector 9. As a result, by way of varying the positions the antenna unit 25A is installed, the reflector 9 is able to have a sophisticated design-related characteristics, and it is possible to enhance the designability of the reflector 9. In addition, because the surface of the reflector 9 is a curved plane and the radiated light from the light source 11 is reflected thereon toward a target position, when the surface of the reflector 9 is used as a radiation position from which the millimeter wave signal D is radiated, it is possible to achieve a high level of radiation performance.

Figure 3:
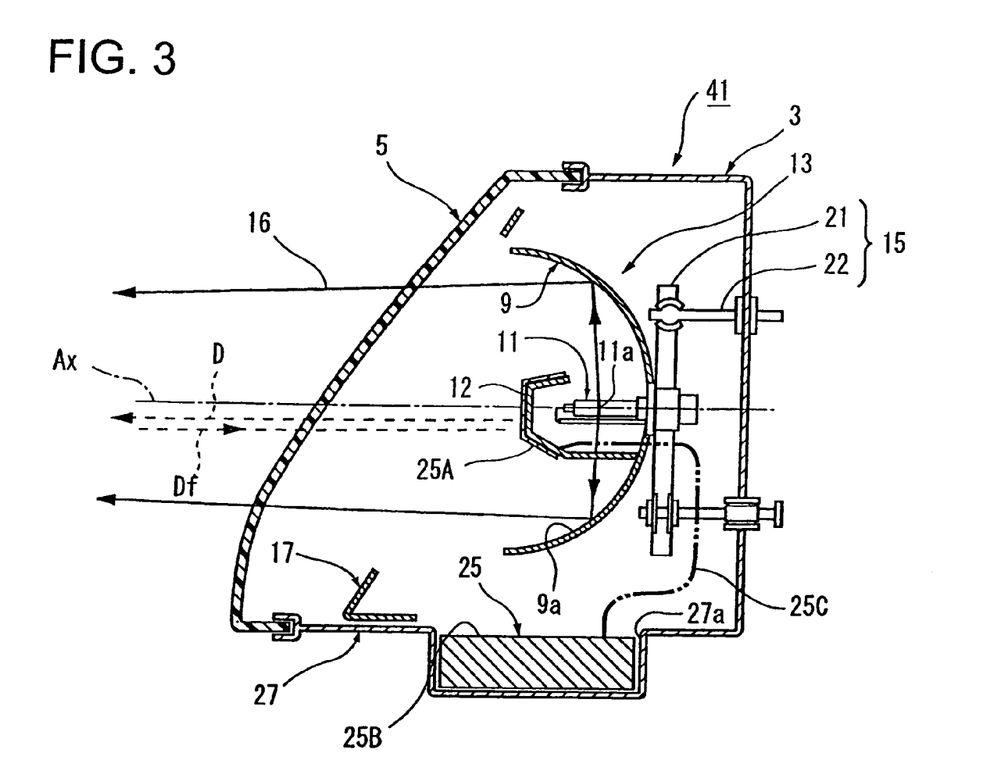
FIG. 3 is a longitudinal sectional view of the essential part of a vehicular lamp according to a second embodiment of the present invention.
Figure 4:
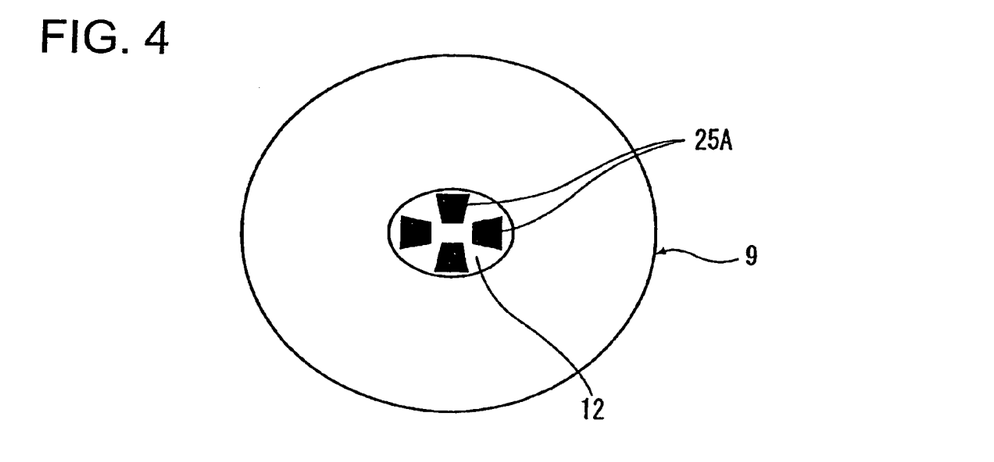
FIG. 4 is a front view of the parabolic shade of the vehicular lamp shown in FIG. 3.

FIG. 3 is a longitudinal sectional view of the featured part of a vehicular lamp according to the second embodiment of the present invention, and FIG. 4 is a front view of the parabolic shade of the vehicular lamp of FIG. 3.

In this vehicular lamp 41 of the second embodiment, the antenna unit 25A of the millimeter wave radar device 25 is provided on the front surface of the shade 12, which is also an area visible from the front cover 5 side. The other configurations are the same as those of the vehicular lamp 1 shown in FIGS. 1 and 2. The component parts that are the same as those of the vehicular lamp 1 will be referred to by the same reference characters, and the description thereof will be omitted.

When the antenna unit 25A is provided on the front surface of the shade 12 as in the shown embodiment, because the antenna unit 25A does not occupy any part of the reflective surface 9a of the reflector 9, the antenna unit 25A does not affect the reflected light quantity, unlike in the example of the vehicular lamp 1 of the first embodiment in which the antenna unit 25A is provided on the reflective surface 9a of the reflector 9. Accordingly, the positional arrangement of the antenna unit 25A does not affect the radiation performance (i.e., the light distribution performance) of the lamp unit 13.

In addition, because the antenna unit 25A gives a visual accent to the shade 12 that is positioned generally at the center of the lamp unit 13, the designability of the lamp is enhanced.

Figure 5:
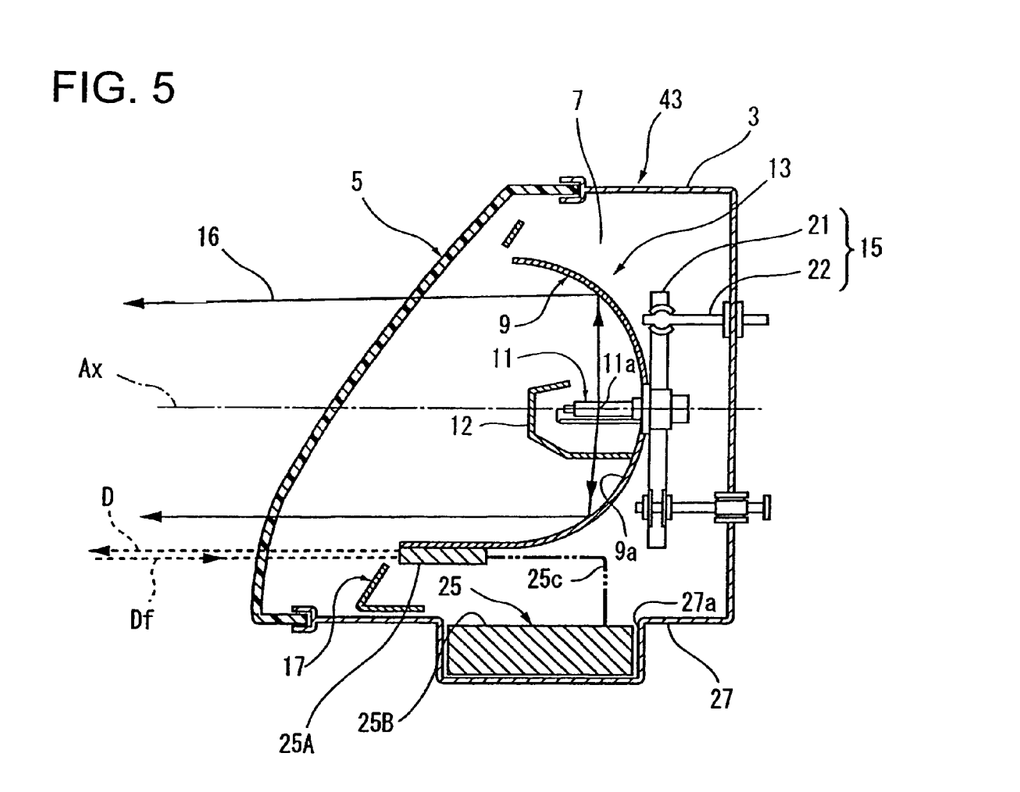
FIG. 5 is a longitudinal sectional view of a vehicular lamp according to a third embodiment of the present invention.
Figure 6:
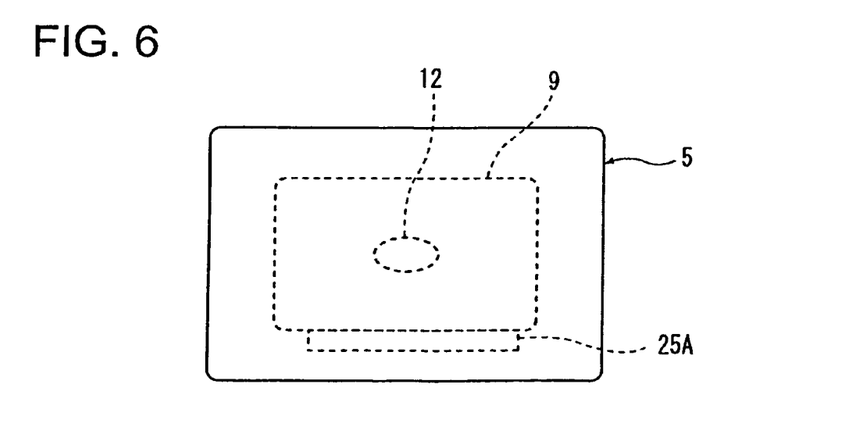
FIG. 6 is a front view of the vehicular lamp shown in FIG. 5.

FIG. 5, a longitudinal sectional view, shows a vehicular lamp of the third embodiment of the present invention, and FIG. 6 is a front view of the vehicular lamp shown in FIG. 5.

In the vehicular lamp 43 of this third embodiment, the antenna unit 25A of the millimeter wave radar device 25 is provided on the lower surface on the front end side of the reflector 9, which is an area visible from the front cover 5 side. The other configurations are the same as those of the vehicular lamp 1 of the first embodiment. The component parts that are the same as those in the vehicular lamp 1 will be referred to by the same reference characters, and the description will be omitted.

When the antenna unit 25A is on the lower surface on the front end side of the reflector 9, the antenna unit 25A does not occupy any part of the reflective surface 9a of the reflector 9. Accordingly, the antenna unit 25A does not affect the reflected light quantity, unlike the structure of the first embodiment in which the antenna unit 25A is provided on the reflective surface 9a of the reflector 9. Accordingly, the positional arrangement of the antenna unit 25A does not affect the radiation performance of the lamp unit 13.

Figure 7A:
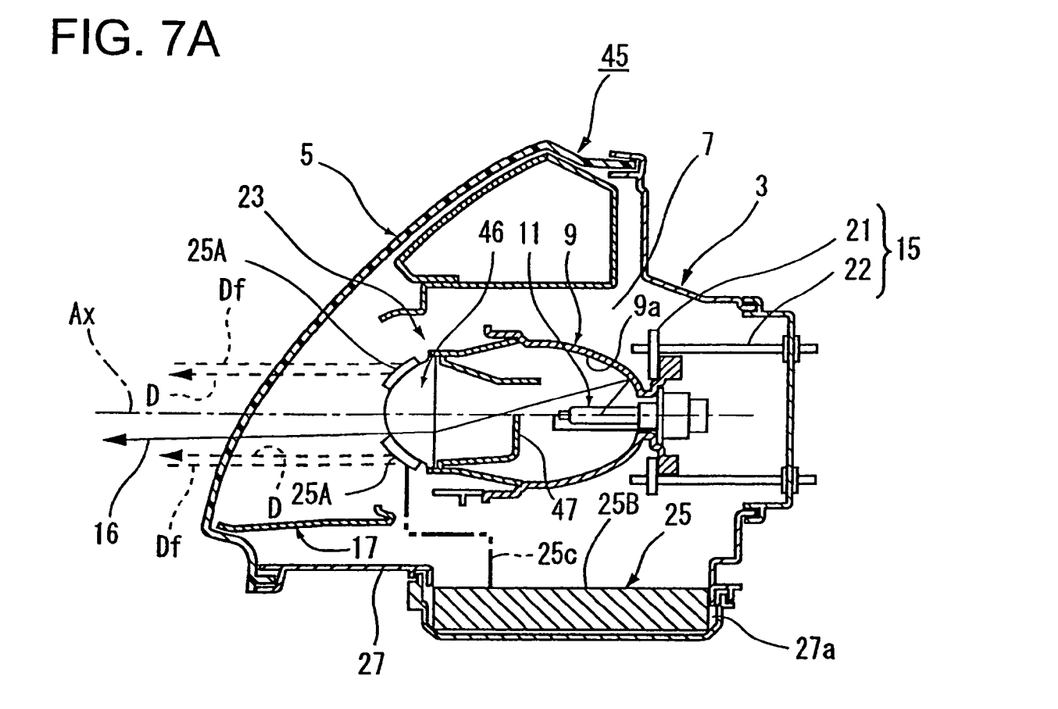
FIG. 7A is a longitudinal sectional view of a vehicular lamp according to a fourth embodiment of the present invention, FIG. 7B being a front view of the projection lens of the vehicular lamp shown in FIG. 7A.
Figure 7B:
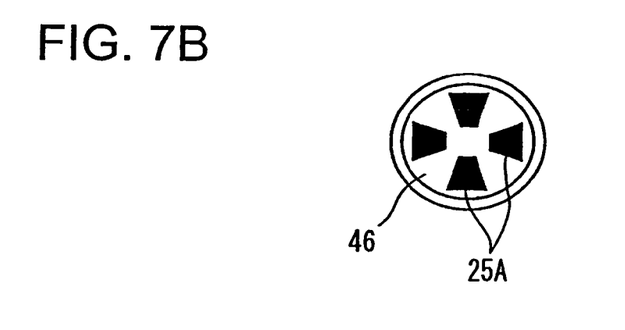

FIG. 7A is a longitudinal sectional view of a vehicular lamp according to the fourth embodiment of the present invention, and FIG. 7B is a front view of the projection lens of the vehicular lamp shown in FIG. 7A. The component parts that are the same as those in the vehicular lamp 1 of FIG. 1 will be referred to by the same reference characters, and the description will be omitted.

The vehicular lamp 45 of FIGS. 7A and 7B includes a lamp unit 23 provided inside the lamp chamber 7 that is defined and formed by the lamp body 3 and front cover 5, and the direction of the optical axis Ax of the lamp unit 23 is adjustable with the use of the tilting movement adjustment mechanism 15.

In this vehicular lamp 45 of the fourth embodiment, the lamp unit 23 is of a projector type and radiates the reflection beam from the reflector 9 toward the front of the lamp through a projection lens 46 that is provided in front of the reflector 9.

In this vehicular lamp 45 that contains the projector type lamp unit 23, a shade 47 is provided between the light source 11 and the projection lens 46. The shade 47 blocks part of the reflection beam from the reflector 9 and direct light from the light source 11 so as to form a cut-off line of a predetermined light distribution pattern.

The millimeter wave radar device 25 is comprised of the antenna unit 25A and the controlling unit 25B, but they are installed separately from each other. In other words, the controlling unit 25B is attached to the bottom wall 27 of the lamp body 3 positioned beneath the lamp unit 23, and the antenna unit 25A is provided on the front surface of the projection lens 46 so as to be visible from the side of the front cover 5.

As seen from the above, by changing the installation positions of the antenna unit 25A as described above and shown in FIGS. 7A and 7B, the projection lens 46 may have a great deal of diversities in its exterior design.

The area of the projection lens 46 in which the antenna unit 25A is provided is not necessarily the front (outer) surface of the projection lens 46.

Figure 8A:
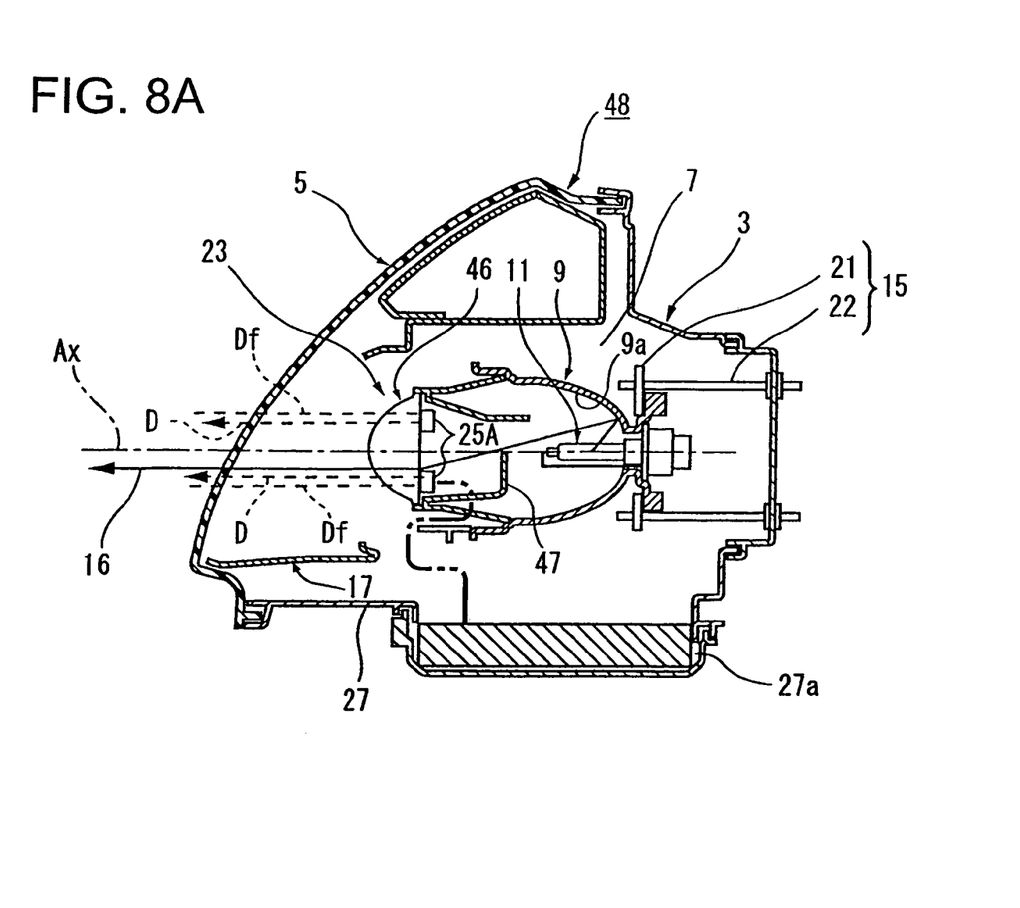
FIG. 8A is a longitudinal sectional view of a vehicular lamp according to a fifth embodiment of the present invention, FIG. 8B being a front view of the projection lens of the vehicular lamp shown in FIG. 8A.
Figure 8B:
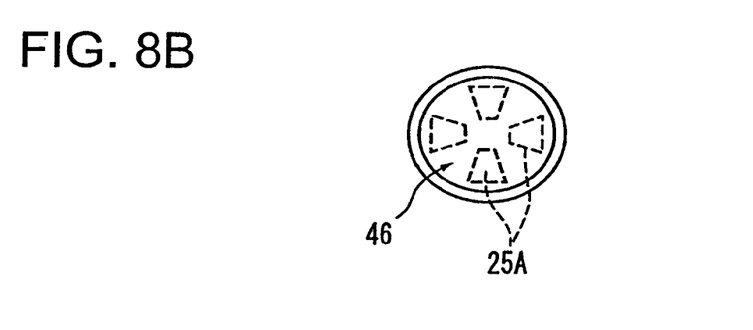

FIG. 8A is a longitudinal sectional view of a vehicular lamp of the fifth embodiment of the present invention, and FIG. 8B is a front view of the projection lens of the vehicular lamp of FIG. 8A; and in this embodiment, the antenna unit 25A is provided on the rear (inner) surface of the projection lens 46.

In other words, the vehicular lamp 48 of the fifth embodiment is similar to the vehicular lamp 45 of the fourth embodiment in that the antenna unit 25A is provided on the projection lens 46.

However, in the fifth embodiment, the area in which the antenna unit 25A is provided is on the rear (inner) surface of the projection lens 46.

More specifically, the projection lens 46 is a planoconvex lens, and thus its front surface forms a convex curved plane, while the rear surface forms a flat plane, and the antenna unit 25A is provided on the rear surface of the projection lens 46. In this structure, it is possible to make the process of attaching (i.e., pasting) the antenna unit 25A onto the projection lens 46 easier.

Figure 9:
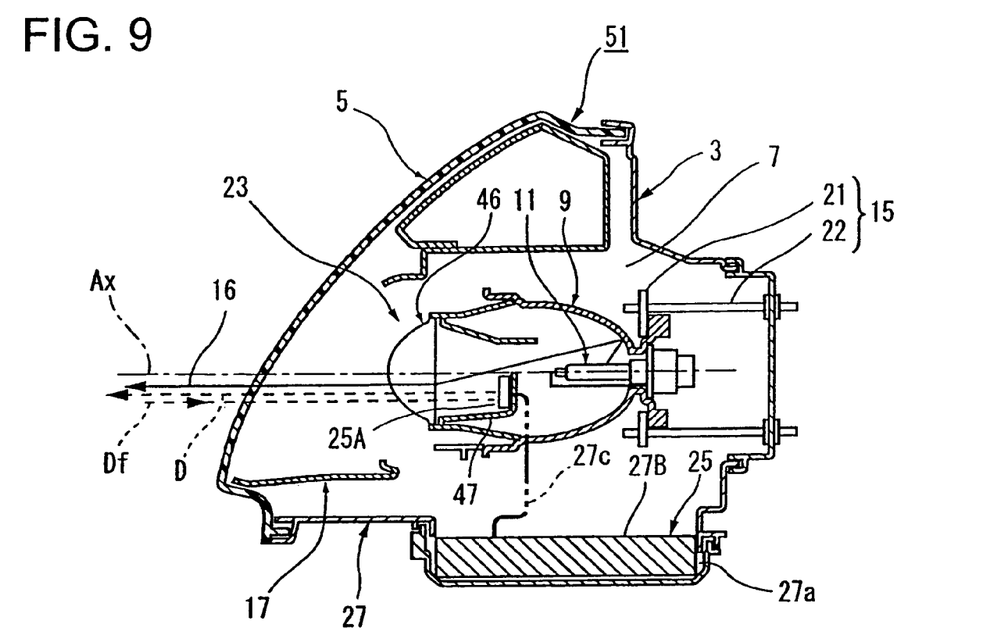
FIG. 9 is a longitudinal sectional view of a vehicular lamp according to a sixth embodiment of the present invention.

FIG. 9 is a longitudinal sectional view of a vehicular lamp according to the sixth embodiment of the present invention.

In the vehicular lamp 51 of the sixth embodiment, the antenna unit 25A in the vehicular lamp 45 of the fourth embodiment shown in FIG. 7A is changed to a different position. The other configurations are the same as those of the vehicular lamp 45 of the fourth embodiment. The component parts that are the same as those of the fourth embodiment will be referred to by the same reference characters, and the description will be omitted.

In the fifth embodiment of the present invention shown in FIG. 9, the area in which the antenna unit 25A is provided is the front surface of the shade 47 that is installed inside the lamp unit 23. The front surface of the shade 47 is the area that is visible from the front cover 5 side. In this structure, the antenna unit 25A does not block the radiated light from the reflector 9, unlike in the structure in which the antenna unit 25A is installed on the projection lens 46. Accordingly, the antenna unit 25A does not positionally affect the radiation performance of the lamp unit 23.

Figure 10:
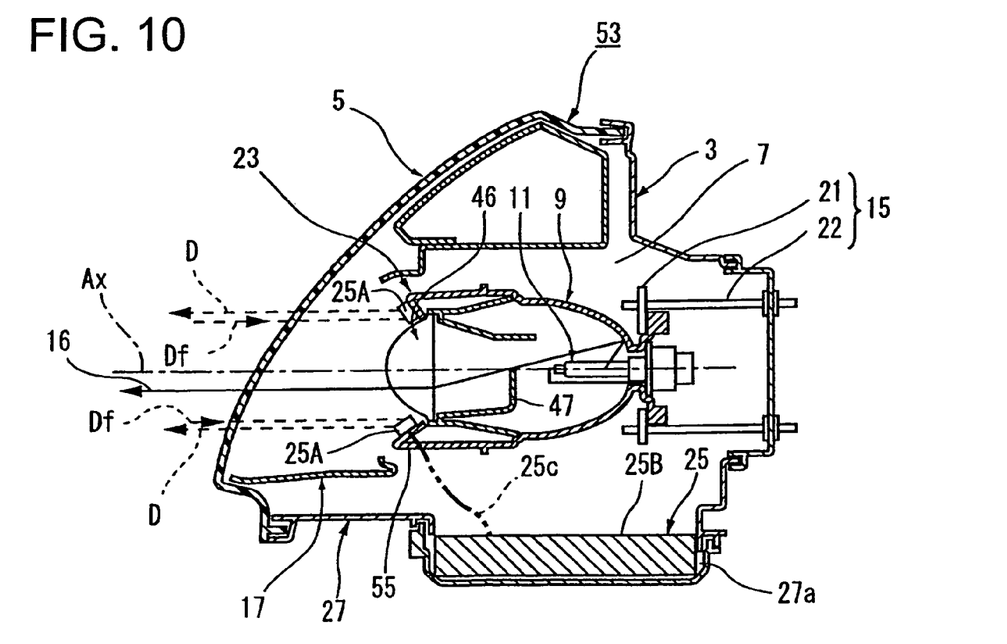
FIG. 10 is a longitudinal sectional view of a vehicular lamp according to a seventh embodiment of the present invention.

FIG. 10 is a longitudinal sectional view of a vehicular lamp according to the seventh embodiment of the present invention.

The vehicular lamp 53 of this seventh embodiment is obtained by changing the position of the antenna unit 25A in the vehicular lamp 45 of the fourth embodiment shown in FIG. 7A. The other configurations are the same as those of the vehicular lamp 45 of the fourth embodiment, and the component parts that are the same as those in the vehicular lamp 45 will be referred to by the same reference characters with the description thereof being omitted.

In this seventh embodiment of FIG. 10, the surface of a member 55 that is provided on the outside periphery of the reflector 9 of the lamp unit 23 is chosen as the area the antenna unit 25A is provided. The member 55 is, for example, a bezel or a reflector fixing bracket. In other words, the component parts of the lamp unit of the present invention include a bezel or reflector fixing bracket, which is indicated as the member 55, in addition to the optical system members such as the light source, the reflector, the shade, and the like.

In this structure of FIG. 10, the designability of the lamp is enhanced by allowing the outside periphery of the reflector 9 to have a design-oriented characteristic.

In addition, as in the structure of the sixth embodiment, the antenna unit 25A does not block the reflection beam from the reflector 9 or the direct light from the light source 11. Accordingly, the installation of the antenna unit 25A does not lower the light quantity utilization efficiency of the radiation in the forward direction, and the positional arrangement of the antenna unit 25A does not affect the radiation performance of the lamp unit 23.

The configurations of the lamp body, the front cover, the lamp unit, the tilting movement adjustment mechanism, the millimeter wave radar device, the antenna unit, the controlling unit, and the like of the vehicular lamps of the present invention are not limited to the examples described above and shown in FIGS. 1 through 10. Needless to say, the configurations can be in any other various forms based on the gist of the present invention.

For example, though the tilting movement adjustment mechanism described in the above embodiments includes both the aiming mechanism and the swivel mechanism, it is acceptable as long as the tilting movement adjustment mechanism includes at least the aiming mechanism. In addition, needless to say, other tilting movement adjustment mechanisms such as an optical axis direction automatic adjustment mechanism (e.g., an automatic leveling system) can be employed additionally in the present invention.

The invention claimed is:

1. A vehicular lamp comprising
a lamp chamber formed by a lamp body having a front opening and a transparent front cover attached to the front opening of the lamp body, and
a lamp unit provided in the lamp chamber so that an optical axis direction of the lamp unit is adjustable with use of a tilting movement adjustment mechanism; wherein
the lamp chamber is provided therein with a millimeter wave radar device that emits a millimeter wave signal and detects at least a separation distance and a relative velocity with respect to an object based on a reflection wave signal from the object that has reflected the emitted millimeter wave signal;
the millimeter wave radar device is comprise of an antenna unit and a controlling unit that are provided separately from each other, the antenna unit transmitting the millimeter wave signal and receiving the reflection wave signal resulting from the emitted millimeter wave signal, and the controlling unit controlling operations to transmit and receive the millimeter wave signal performed by the antenna unit so as to detect, based on the reflection wave signal received by the antenna unit, at least the separation distance and the relative velocity with respect to the object that has reflected the millimeter wave signal; and
the controlling unit of the millimeter wave radar device is attached to the lamp body, and the antenna unit is attached to the lamp unit.

2. The vehicular lamp according to claim 1, wherein the antenna unit is provided in an area that is visible from a front cover side.

3. The vehicular lamp according to claim 2, wherein said area is a reflective surface of a reflector of the lamp unit.

4. The vehicular lamp according to claim 2, wherein
the lamp unit is a projector type lamp unit in which a reflection beam from the reflector is radiated toward front of the vehicular lamp through a projection lens provided in front of the reflector, and
said area is one of a front surface and a rear surface of the projection lens.

5. The vehicular lamp according to claim 2, wherein said area is a surface of a member that is provided on an outside periphery of the reflector.

* * * * *